K. GAMMEL.
PROCESS OF DRYING EDIBLE PASTES.
APPLICATION FILED SEPT. 1, 1911. RENEWED APR. 5, 1918.
1,284,305.
Patented Nov. 12, 1918.
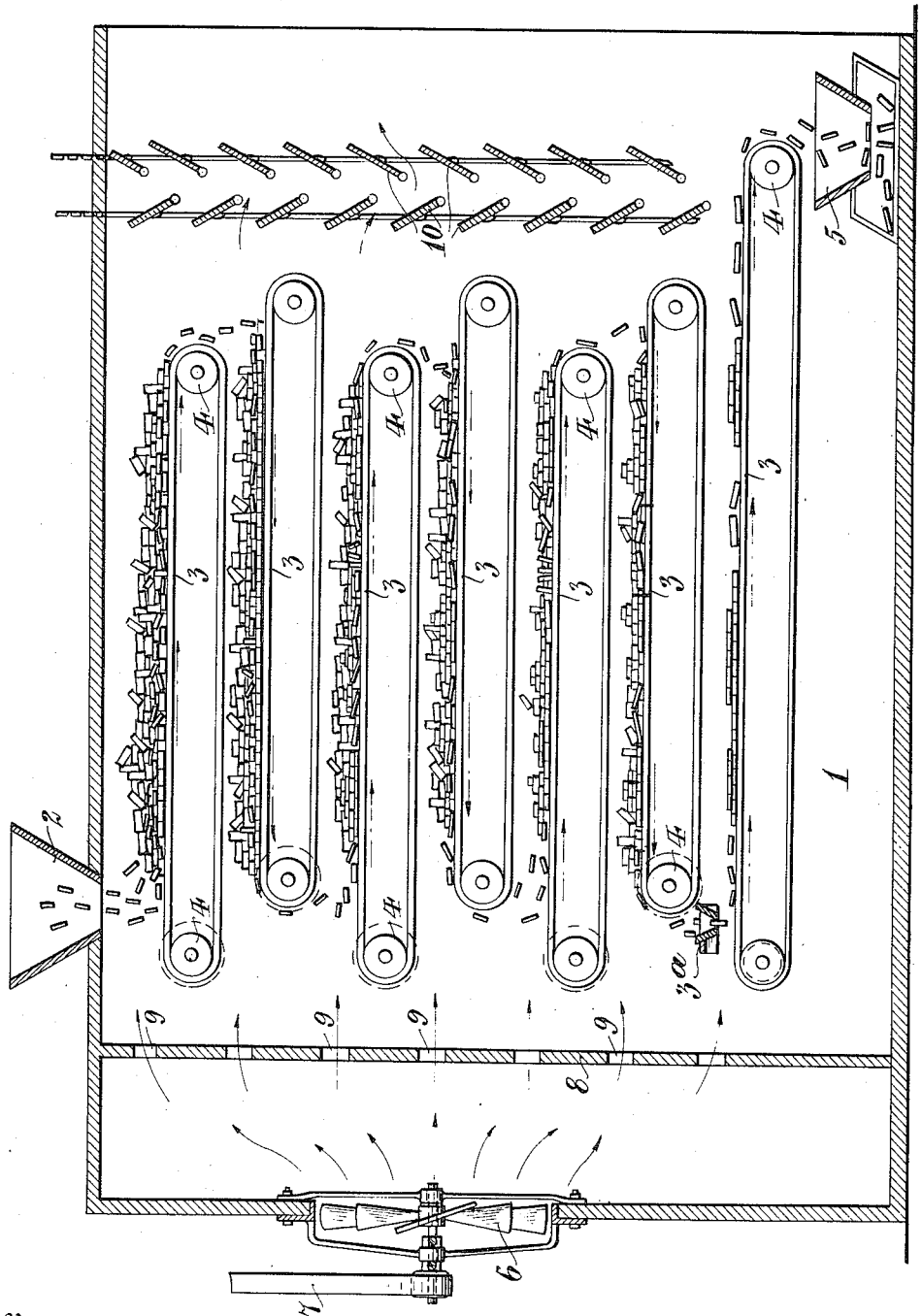

UNITED STATES PATENT OFFICE.

KARL GAMMEL, OF CLEVELAND, OHIO, ASSIGNOR TO THE CLEVELAND MACARONI COMPANY, OF CLEVELAND, OHIO, A CORPORATION OF OHIO.

PROCESS OF DRYING EDIBLE PASTES.

1,284,305.  Specification of Letters Patent.  Patented Nov. 12, 1918.

Application filed September 1, 1911, Serial No. 647,183. Renewed April 5, 1918. Serial No. 226,964.

*To all whom it may concern:*

Be it known that I, KARL GAMMEL, a subject of the Emperor of Germany, residing at Cleveland, in the county of Cuyahoga and State of Ohio, have invented certain new and useful Improvements in Processes of Drying Edible Pastes, of which the following is a specification.

It is well known that the artificial drying of macaroni paste foods presents many difficulties in order to avoid the breaking or cracking of the product and to obtain the necessary flavor and appearance. Such products are extremely liable to crack and break during the drying process, thus resulting in a large percentage of loss, and if not dried slowly and cautiously, they usually do not have the characteristic color and flavor possessed by properly perpared goods, but on the contrary, appear like particles of dry dough prepared from ordinary flour.

The primary object of my invention is to provide means whereby the small portions of macaroni paste foods, which are commonly known as short cuts, and similar products, because a strip of dough is cut into short pieces, may be dried very rapidly and at the same time possesses the characteristic color and flavor of goods dried slowly and with the usual precautions to produce just the right amount of fermentation, to give the necessary flavor to the goods, and to produce the desired color on the surface of the goods.

A further object of the invention is to provide a process whereby, during the drying operation, the sharp edges or fins left on the goods by the cutters may be automatically removed and the goods be given a slightly polished appearance.

The various other objects of the invention will be more fully set forth in the following description of the process embodying my invention which consists in the new and novel steps and combinations of steps hereinafter set forth and claimed.

According to my process, the paste, after being cut into the desired length, is spread upon a suitable surface several layers deep, and subjected for a relatively short period to the action of a current of air which will remove a portion of the surface moisture from the exposed layer. Preferably, said air current is maintained at a temperature between 76 to 80° F. in any suitable manner and may be of varying velocity. The goods are then re-arranged in such a manner that the previously exposed portions of the goods will be buried by the other portions or particles of the goods and thus protected, to an extent, from another air current to which the goods may be subjected, thus giving the moisture contained in the goods so protected an opportunity to pass to the surface and produce what may be properly termed a sweating of the goods so protected. Meanwhile, the previously protected layer of goods is being exposed to the air current and having the surface moisture removed therefrom.

This operation is repeated for a number of times until approximately all of the goods have been alternately subjected to a drying and a sweating process. Finally, the goods may be spread out in a relatively thin layer and again subjected to a drying current of air until all the moisture is absorbed preparatory to removing the goods from the drying chamber.

In the accompanying drawing I have shown, diagrammatically, one form of apparatus adapted for carrying out my improved process. Said apparatus comprises a chamber 1 having a hopper 2 or other suitable means for supplying the goods to the chamber. A plurality of endless conveyers 3 are carried on rollers 4 within the chamber so that the conveyers may be caused to travel in the lines indicated by the arrows at a slow rate of speed. The alternate carriers project in opposite directions, that is, they are staggered in relation to each other so that the goods will be delivered from one carrier onto the next. The lowest carrier may extend outside of the casing or to the extreme end thereof, and delivers the goods to a suitable receptacle 5.

At one end of the casing a fan 6, or other suitable means for producing a current of air in the casing, is mounted so that the current of air will be delivered lengthwise of the casing. Any suitable means, as a belt 7, may be provided for the purpose of driving the fan. A partition 8 is arranged between the fan and the conveyers, which is provided with a series of openings 9 in line with the upper portion or layer of goods which may be on each conveyer. At the opposite end of the casing is arranged a baffle plate 10, which comprises suitable plates staggered with relation to each other, and which provide sufficient resistance to retard the velocity of the air throughout the spaces above the layers of goods. The baffle plate is cut away or terminated adjacent to the lowermost carrier or conveyer, thus permitting a continuous current of air to sweep over said carrier or conveyer at approximately uniform speed and thus produce a greater drying effect than on the other conveyers.

In operation, the goods are supplied to the upper conveyer in sufficient quantity to form a relatively thick mass comprising a plurality of layers. The current of air passing through the upper opening 9 provided in the partition 8, dries the layer which may be exposed. When the goods reach the end of the carrier, they fall upon the second conveyer which is spaced sufficiently from the first to cause a complete rearrangement of the product, and cause the previously exposed layer to be buried beneath the previously protected layer. An air current is caused to play upon the goods through the second opening 9 as the conveyer travels, until the goods again fall and are rearranged upon the third conveyer where they are again automatically rearranged and another layer exposed to the air current. The velocity of the air current is gradually decreased toward the baffle plates 10, which may be adjustable in any well known manner, as by swinging the plates 10 about an internal axis to bring the plates toward a closing position, so that the current may be stopped completely if desired. On the lowermost conveyer, however, the drying operation is preferably continued throughout the full travel of the conveyer, effectually and completely removing all surface moisture which may be on the product. A suitable guide 3ª may be provided to distribute the goods thinly over the lowermost conveyer, if desired.

By this process, the goods, such as short cut, sea shell and similar products, may be dried in a period of several hours as compared with the period of two to three days required by the process heretofore used. The alternate drying and sweating of the goods causes the coloring matter contained in the goods to be carried to the surface, and at the same time produces the desirable flavor characteristic of the slowly dried goods. The movement of the particles of goods over each other during the agitation thereof in passing from one conveyer to the other, also removes any inequalities on the surface of the particles and gives them a finished or polished appearance, which is especially desirable in goods of this character.

Near the lowest conveyer 3, a guide 3ª is provided which distributes the paste in a thin layer. In order to increase this effect of a thin layer this lowest conveyer may be made wider and driven at a higher speed than the upper conveyers if desired.

Although I have described the preferred method of carrying out my process, it will be obvious that various slight changes in the several steps may be made without departing from the spirit of the invention, provided the several steps set forth in the following claims be employed.

I claim as my invention:

1. The process of drying short sections of edible pastes, which process consists in subjecting the goods when arranged in a mass of several layers' depth to an air current until the particles comprising the outer layer are partially dried, then rearranging said mass so that a new layer will be exposed and the partially dried particles will be buried in the interior of the mass and maintaining this position until the newly exposed particles are partially dried and then subjecting said mass to another rearrangement and repeating these operations until the drying is completed.

2. The process of drying short sections of edible pastes, which process consists in subjecting the goods when arranged in a mass of several layers' depth to an air current until the particles comprising the outer layer are only partially dried, then agitating said mass so that a new layer will be exposed and the partially dried particles will be buried in the interior of the mass and maintaining this position until the newly exposed particles are partially dried and the said first mentioned particles have again become moist, and repeating these operations until the drying is completed and the goods slightly polished.

3. The process of drying short sections of edible pastes which are in a moist condition, which process consists in subjecting the goods while arranged in a mass of several layers' depth to the action of an air current of reduced velocity until the particles comprising the outer layer are partially dried, then rearranging said mass so that a new layer will be exposed and the partially dried particles will be buried in the interior of the mass, and repeating these operations and finally subjecting all of the particles to an air current of unreduced velocity.

This specification signed and witnessed this 28th day of August A. D., 1911.

KARL GAMMEL.

Witnesses:
G. R. COLLAR,
E. M. HOLMGREN.